United States Patent [19]

Kami et al.

[11] 4,396,202
[45] Aug. 2, 1983

[54] LEVELING SYSTEM FOR MOTOR VEHICLES

[75] Inventors: Yozo Kami, Saitoma; Akiyuki Kinbara, Waka; Kunitaka Furuya, Saitama, all of Japan

[73] Assignee: Honda Giken Kogyo Kabushiki Kaisha, Tokyo, Japan

[21] Appl. No.: 286,652

[22] Filed: Jul. 24, 1981

[30] Foreign Application Priority Data

Aug. 4, 1980 [JP] Japan ................................ 55-106948

[51] Int. Cl.³ .............................................. B60G 17/00
[52] U.S. Cl. ................................... 280/6 R; 280/698; 280/711; 280/714; 280/DIG. 1; 280/64.16
[58] Field of Search ............... 280/6 R, 6 H, 6.1, 711, 280/708, 714, DIG. 1, 698; 267/64.16, 64.17

[56] References Cited

U.S. PATENT DOCUMENTS

| | | | |
|---|---|---|---|
| 2,919,929 | 1/1960 | Jackson | 280/711 |
| 2,939,723 | 6/1960 | Wisniewski | 280/714 |
| 3,006,657 | 10/1961 | Augustin | 280/714 |
| 3,021,151 | 2/1962 | Haddad | 280/714 |
| 3,059,918 | 10/1962 | Pribonic | 280/714 |
| 3,433,493 | 3/1969 | Hirst | 280/6 R |
| 3,466,055 | 9/1969 | Keijzer | 280/6 R |
| 3,477,753 | 11/1969 | Gottschalk | 280/6 R |
| 3,653,676 | 4/1972 | Higginbotham | 280/6 R |
| 4,030,777 | 6/1977 | Rabenseifner | 280/714 |
| 4,335,901 | 6/1982 | Gladish | 280/711 |

*Primary Examiner*—Robert R. Song
*Attorney, Agent, or Firm*—Irving M. Weiner; Pamela S. Burt; John L. Shortley

[57] ABSTRACT

A leveling system for motor vehicles including leveling dampers at front and rear road wheels, a solenoid-operated selector valve assembly connected between an air compressor and the leveling dampers, and a central processing unit programmed so as to be responsive to command signals from level sensors or a manual override control switch for controlling the selector valve assembly to direct pressurized air through selected pneumatic circuits to the level dampers, thus adjusting the riding height of the vehicle frame, even in opposite directions, at the front and rear road wheels. A drier is disposed in the pneumatic circuit downstream of the air compressor to remove water from the pressurized air for preventing the leveling system from malfunctioning due to the presence of water in the system.

5 Claims, 6 Drawing Figures

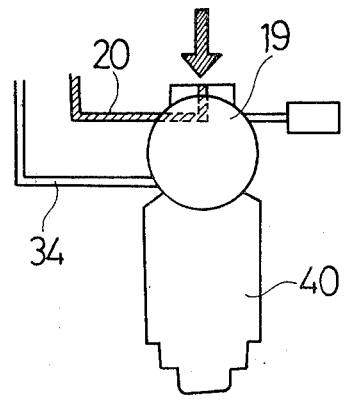
FIG. 2
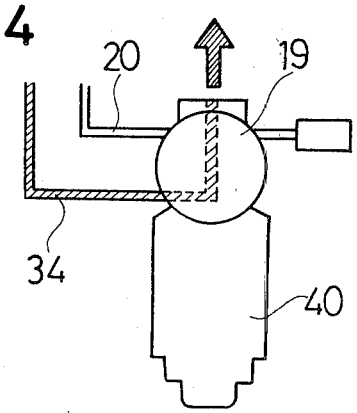
FIG. 4
FIG. 5
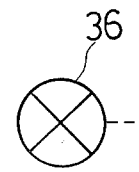
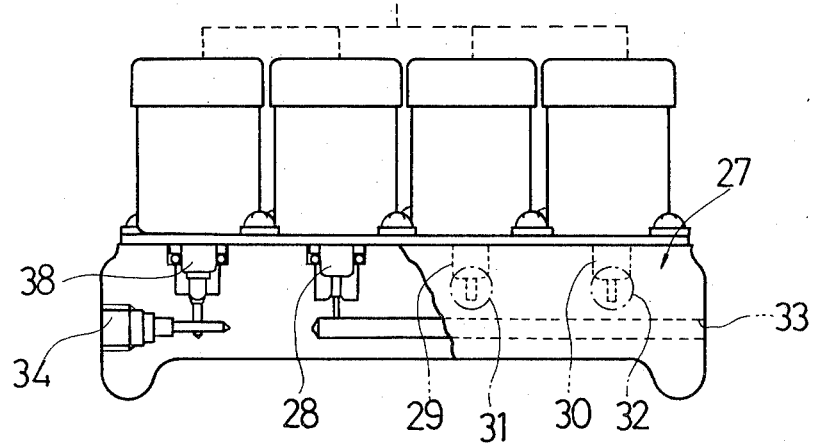

LEVELING SYSTEM FOR MOTOR VEHICLES

BACKGROUND OF THE INVENTION

1. Field of the Invention

The present invention relates to a leveling system for motor vehicles, and more particularly to a leveling system for supplying a pneumatic pressure to or discharging a pneumatic pressure from pneumatic chambers attached to hydraulic shock absorbers of a vehicle suspension apparatus.

2. Prior Art

Known leveling mechanism for motor vehicles supply a fluid pressure in a system which differs from a shock absorbing system to adjust the vehicle riding height under different driving and parking conditions. Most of the prior leveling mechanisms utilize a hydraulic pressure, and require costly piping, valves and pumps.

A leveling system using a pneumatic pressure is disclosed in U.S. Pat. No. 2,939,723 to W. E. Wisnieski, patented June 7, 1960. According to the disclosed leveling system, the riding height of a vehicle chassis is automatically adjusted in response to changes in the relationship between the vehicle frame and the road wheels, and a manual override control is incorporated to selectively change the vehicle riding height under load and road conditions. Since systems for supplying air are separately provided respectively for automatic and manual controls, lengthy piping and many valves are required which are complex in construction, resulting in an increase in the weight of the motor vehicle. The conventional leveling system includes air springs disposed at the front and rear of the vehicle and leveling valves provided respectively for the air springs. However, with this arrangement, it is not possible with manual control to adjust the vehicle riding height in opposite directions at the front and rear of the vehicle (for example, to raise the front of the vehicle by supplying air to the front air springs and lower the rear of the vehicle by exhausting air from the rear air springs). Air used under pressure for adjusting the riding height of the vehicle is introduced from the atmosphere which contains considerable humidity. The water in the introduced air tends to create rust in the valves and pipes, with the result that the durability of the leveling system will be reduced.

SUMMARY OF THE INVENTION

The present invention eliminates the foregoing problems in a system utilizing air as a vehicle level controlling fluid for adjusting the riding height of a vehicle at the front and rear thereof in both automatic and manual control modes of operation.

According to the present invention, there is provided a leveling system for a motor vehicle having a vehicle frame and front and rear road wheels, comprising dampers adapted to be disposed between the vehicle frame and the front and rear road wheels and having respective pneumatic pressure chambers, means for generating a pneumatic pressure, a pneumatic circuit connected between the means and the pneumatic pressure chambers, a valve assembly disposed in the pneumatic circuit for supplying pressurized air to and discharging pressurized air from the pneumatic pressure chambers, a plurality of level sensors adapted to be disposed at the front and rear of the vehicle, a manual control switch for adjusting the height of the vehicle, a control unit responsive to signals from the level sensors and the manual control switch for controlling the valve assembly to direct pressurized air in the pneumatic circuit in predetermined patterns, and a drier disposed in the pneumatic circuit downstream of the pneumatic pressure generating means.

The valve assembly comprises valves for supplying air to the dampers at the front and rear of the vehicle frame, and a single valve for exhausting air.

The air supplying valves and the air exhausting valve are communicable with each other exteriorly of the valve assembly.

Air under pressure can be supplied to and discharged from the pneumatic circuit through the pneumatic pressure generating means.

Accordingly, it is an object of the present invention to provide a leveling system for motor vehicles which has piping of a simplified structure and a reduced number of valves.

Another object of the present invention is to provide a leveling system for motor vehicles which can adjust the riding height of the vehicle frame in opposite directions at the front and rear of the vehicle in a manual control mode of operation as well as in an automatic control mode.

Still another object of the present invention is to provide a leveling system for motor vehicles which has means for removing water from pressurized air as it is supplied or discharged so as to reduce the risk of malfunctioning of the leveling system due to the presence of water in the system.

The above and other objects and advantages of the present invention will become apparent from the following description when taken in conjunction with the accompanying drawings which show a preferred embodiment of the present invention by way of example.

BRIEF DESCRIPTION OF THE DRAWINGS

FIG. 2 is a schematic plan view of an air compressor as it introduces air.

FIG. 4 is view similar to FIG. 2, showing the air compressor as it discharges air.

FIG. 5 is an enlarged plan view, with parts cut away, of a solenoid-operated valve assembly.

DETAILED DESCRIPTION

Figure 6:
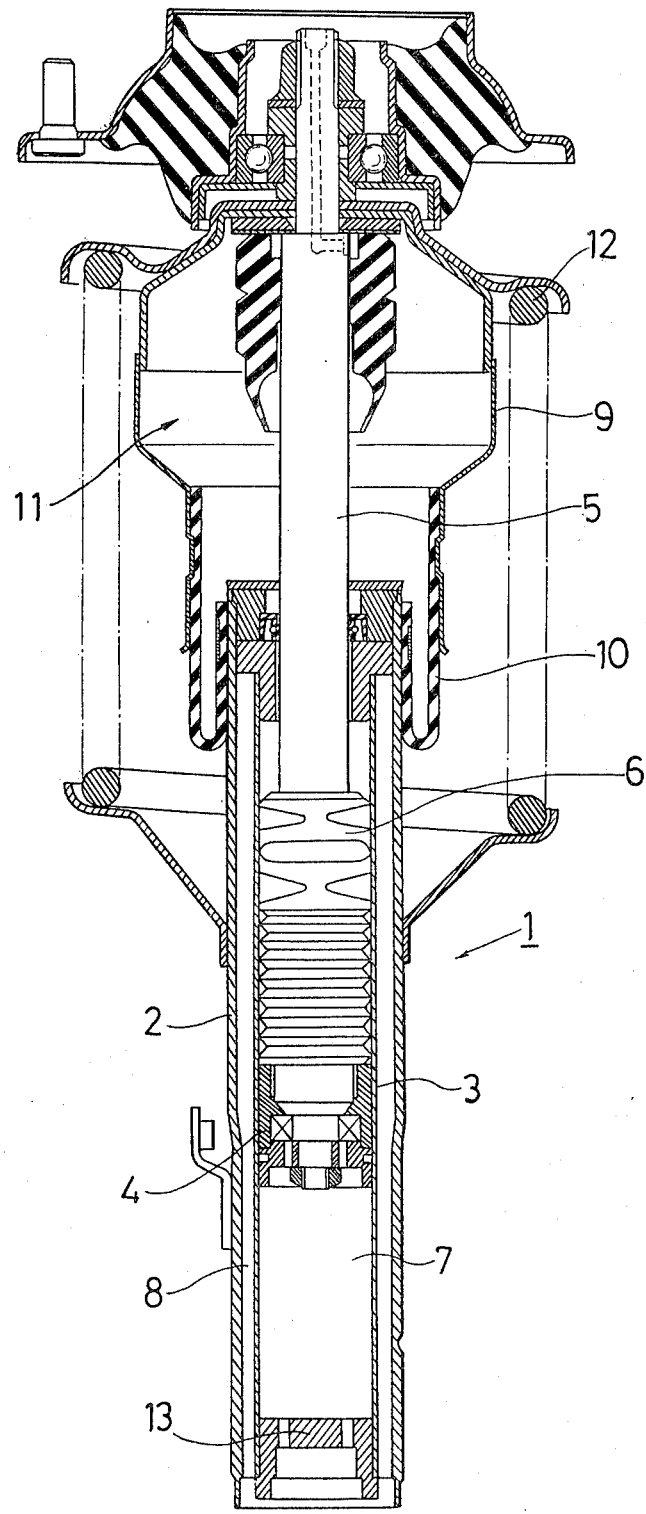
FIG. 6 is an enlarged vertical cross-sectional view of a leveling damper.

As shown in FIG. 6, a leveling damper 1 comprises an outer cylinder 2, an inner cylinder 3 disposed in the outer cylinder 2, a piston 4 slidably fitted in the inner cylinder 3, a rod 5 connected at a lower end thereof to the piston 4 and extending upwardly out of the outer cylinder 2, and a rebound stopper 6 disposed around the rod 5 for effecting damping action. The inner cylinder 3 has therein a hydraulic pressure chamber 7 defined below the piston 4 and held in communication with a reservoir chamber 8 defined between the inner and outer cylinders 3, 2 through a bottom valve 13 located in the lower end of the cylinder 3. The outer cylinder 2 is coupled to a vehicle wheel and the rod 5 is coupled to a vehicle frame. Hydraulic damping action is performed by a hydraulic pressure generated when the piston 4 is caused to slide axially in the inner cylinder 3. Between the upper end of the outer cylinder 2 and a support cylinder 9 connected to the upper end of the rod 5, there is sealingly attached a folded flexible cylinder 10 made of rubber for example, the cylinders 9, 10 jointly bounding a pneumatic pressure chamber 11. When pressurized air is admitted into the pneumatic pressure chamber 11, the rod 5 is forced to move in a direction out of the cylinders 2, 3 to increase the height of the vehicle. Conversely, discharging pressurized air out of the pneumatic pressure chamber 11 causes the rod 5 to return into the cylinders 2, 3 for a relative reduction in the vehicle riding height. A cushioning spring 12 acts between the rod 5 and the outer cylinder 2.

Figure 1:
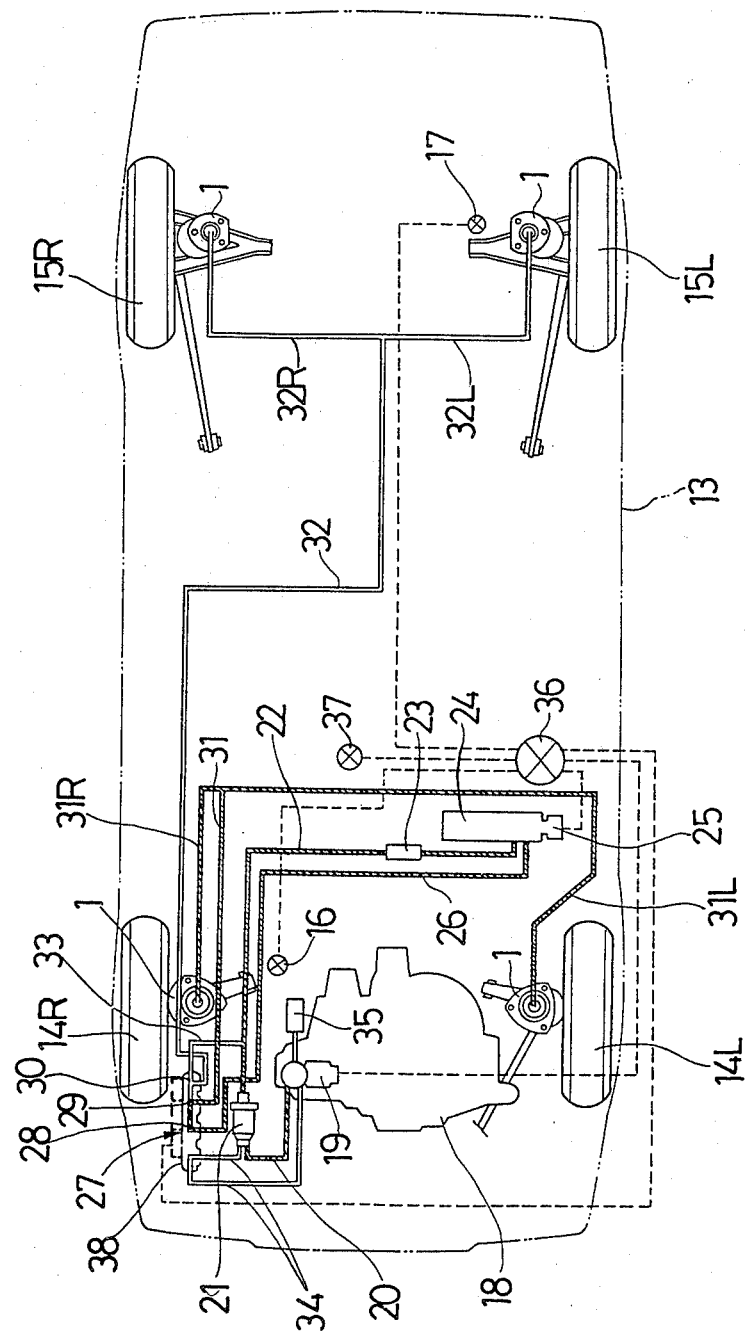
FIG. 1 is a plan view of a leveling system according to the present invention, the leveling system being shown in a circuit diagram form for an air supplying mode of operation.

As illustrated in FIG. 1, the leveling damper 1 thus constructed is employed as a suspension damper for each of right and left front road wheels 14R, 14L and right and left rear road wheels 15R, 15L of a motor vehicle 13, the leveling damper 1 being installed between the vehicle frame and the wheel. A pair of sensors 16, 17 for detecting a vehicle level or riding height are provided at the front and rear of the vehicle where the sensors are coupled between the vehicle frame and wheels. Each of the level sensors 16, 17 should preferably be located close to one of the adjacent front and rear wheels for an increased degree of accuracy in the vehicle level detection.

An engine 18 is mounted on the frame of the vehicle 13 at a front portion thereof, the engine 18 being equipped with an air compressor 19 which is drivable by a motor 40 (FIG. 2) to introduce air and produce a pneumatic pressure. An air supply pipe 20 is connected between the air compressor 19 and an air drier 21 which contains a replacable desiccant such as silica gel to absorb water from supplied air under pressure. Dried air is supplied via a connector pipe 22 and a check valve 23 to an air reservoir tank 24 having a pressure detection switch 25 for detecting a pneumatic pressure build up in the reservoir tank 24. A connector pipe 26 is connected between the reservoir tank 24 and a solenoid-operated selector valve assembly 27 which comprises a solenoid-operated valve 28 for introducing pressurized air from the reservoir tank 24, solenoid-operated valves 29, 30 connected to pipes 31, 32 and selectively or jointly operable or closable to supply air under pressure to the dampers 1 respectively for the vehicle road wheels 14R, 14L, 15R, 15L, and a solenoid-operated valve 38 for discharging pressurized air, as shown in FIGS. 1 and 5. The pipes 31, 32 include pipe branches 31R, 31L and 32R, 32L, respectively, for supplying pressurized air to and exhausting pressurized air from the pneumatic pressure chambers 11 in the dampers 1. The connector pipe 22 has a branch 33 connected upstream of the check valve 23 to the valves 29, 30 for discharging air. An exhaust pipe 34 is connected between the drier 21 at an upstream side and the air compressor 19, the exhaust pipe 34 extending through the solenoid-operated valve 38. Thus, the valves 29, 30 and the valve 38 are communicable with each other exteriorly of the valve assembly 27 via the pipes 33, 22 and 34. A safety valve 35 is mounted on the compressor 19.

A compressor 19, the level sensors 16, 17, the pressure detection switch 25 on the reservoir tank 24, and the valves 28, 29, 30 and 38 in the solenoid-operated valve assembly 27 are controlled by a Central Processing Unit (CPU) 36. The CPU 36 is responsive to command signals from the level sensors 16, 17 for controlling the solenoid-operated valve assembly 27 to raise the vehicle frame at both or either of the front and rear road wheel pairs. To this end, the CPU 36 controls the compressor 19 so as to be driven or stopped by itself or in response to detection of a pressure build up in the reservoir tank 24, supplies pressurized air again when the vehicle riding height is below a predetermined level, or discharges air from one or both of the front and rear damper pairs to lower the vehicle level. A switch 37 for manual override control is provided in addition to the level sensors 16, 17 to enable the vehicle driver to send a level adjustment command to the CPU 36 at will under various conditions.

When the vehicle riding height is to be raised at the front road wheels 14R, 14L, the leveling dampers 1, 1 at the front road wheels are supplied with pressurized air through a pneumatic circuit established which is shown hatched in FIG. 1. Air as admitted and pressurized in the air compressor 19 as shown in FIG. 2 is supplied via the pipe 20 (FIG. 1), the drier 21 for removing water from the air, and the pipe 22 to the reservoir tank 24 in which dried air under pressure is stored. When the pneumatic pressure in the reservoir tank 24 is lowered below a predetermined level, the pressure detection switch 25 sends a signal to the CPU 36 which controls the compressor 19 to be driven continuously until the pressure in the reservoir tank 24 reaches the predetermined value.

Responsive to a command signal from the level sensors 16, 17 or the manual override control switch 37, the CPU 36 causes the valves 28, 29 in the solenoid-operated valve assembly 27 to be opened, allowing pressurized air to be fed from the reservoir tank 24 through the pipe 26, the valves 28, 29, the pipe 31, and thence through the pipe branches 31R, 31L, into the leveling dampers 1 at the front road wheels 14R, 14L, whereupon the rods 5 or these leveling dampers 1 extend to raise the vehicle frame. When the vehicle frame is to be lifted by the dampers 1 at the rear road wheels 15R, 15L, the CPU 36 opens the solenoid-operated valves 28, 30 to allow pressurized air to be supplied via the pipe 32 to these dampers 1.

Figure 3:
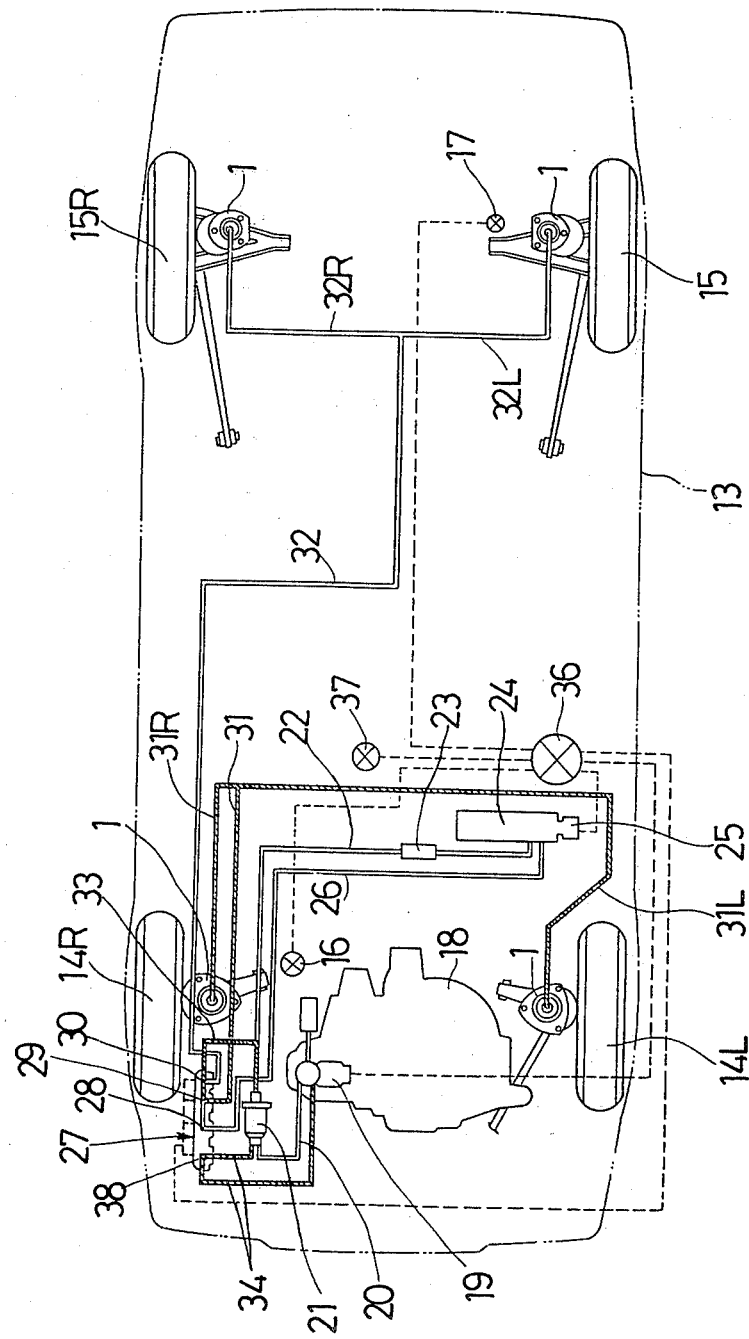
FIG. 3 is a view similar to FIG. 1, showing the leveling system for an air discharging mode of operation.

For reducing the vehicle riding height, the CPU 36 is responsive to a command signal from the level sensors 16, 17 or the manual override control switch 37 for switching the solenoid-operated valve assembly 27 to open the exhaust valve 38. As indicated by a pneumatic circuit shown hatched in FIG. 3, air under pressure is discharged from the dampers 1 at the front road wheels 14R, 14L through the pipe branches 31R, 31L, the pipe 31, the valve 29, the pipe 33, and the pipe 22 downstream of the drier 21. With the check valve 23 preventing the high pneumatic pressure in the reservoir tank 24 from acting in the pipe 22 upstream of the check valve 23, discharged pressurized air enters via the drier 21 into the exhaust pipe 34 and is discharged out through the exhaust valve 38 and the air compressor 19, as shown in FIG. 4. Discharged air is thus caused to pass through the drier 21. Likeiwse, pressurized air from the dampers 1 at the rear road wheels 15R, 15L is discharged via the pipe 32, the valve 30, and the pipe 33.

When the level sensors or manual override control switch issues a command signal to adjust the riding height of the vehicle in opposite directions (upwardly and downwardly) at the front and rear thereof, the CPU 36 controls the solenod-operated valve assembly 27 to give priority to lifting the vehicle frame at first, and after the front or rear of the vehicle frame has been raised, cause the other vehicle frame end to be lowered. When the CPU 36 is supplied with a command signal to raise the vehicle frame at both the front and rear thereof, the CPU 36 gives the frame front periority to be lifted first. Furthermore, when it is required to energize the air compressor 19 and open the exhaust valve 38 simultaneously, the CPU 36 first discharges air from compressor 19 and then supplies pressurized air to the reservoir tank 24.

While in the foregoing embodiment the air reservoir tank 24 has been included, it may be dispensed with if the air compressor 19 has a sufficiently large capacity, and hence the reservoir tank 24 and tank valve 28 may be provided or not, as desired.

Although a preferred embodiment has been described in detail, it should be understood that many changes and modifications may be made therein without departing from the scope of the appended claims.

What is claimed is:

1. A leveling system for a motor vehicle having a vehicle frame and front and rear road wheels, comprising:
    (a) dampers adapted to be disposed between the vehicle frame and the front and rear road wheels and having respective pneumatic pressure chambers;
    (b) means for generating a pneumatic pressure:
    (c) a pneumatic circuit connected between said means and said pneumatic pressure chambers;
    (d) a valve assembly disposed in said pneumatic circuit for supplying pressurized air to and discharging pressurized air from said pneumatic pressure chambers:
    (e) a plurality of level sensors adapted to be disposed at the front and rear of the vehicle;
    (f) a manual control switch for adjusting the height of the vehicle;
    (g) a control unit responsive to signals from said level sensors and said manual control switch for controlling said valve assembly to direct pressurized air in said pneumatic circuit in predetermined patterns; and
    (h) a drier disposed in said pneumatic circuit downstream of said pneumatic pressure generating means.

2. A leveling system according to claim 1, wherein: said valve assembly comprises valves for supplying air to said dampers at the front and rear of the vehicle frame, and a single valve for exhausting air.

3. A leveling system according to claim 2, wherein: said air supplying valves and said air exhausting valve are communicable with each other exteriorly of said valve assembly.

4. A leveling system according to claim 1, wherein: air under pressure can be supplied to and discharged from said pneumatic circuit through said pneumatic pressure generating means.

5. A leveling system according to claim 1, wherein: said control unit is adapted to control said valve assembly to give priority to either supplying air to or exhausting air from predetermined ones of said pneumatic pressure chambers.

* * * * *